(12) United States Patent
Ambroise

(10) Patent No.: US 9,695,306 B2
(45) Date of Patent: *Jul. 4, 2017

(54) MULTILAYER SHRINK FILMS, LABELS MADE THEREFROM AND USE THEREOF

(75) Inventor: Benoit Ambroise, Nobressart (BE)

(73) Assignee: Jindal Films Europe Virton SPRL, Virton (BE)

( * ) Notice: Subject to any disclaimer, the term of this patent is extended or adjusted under 35 U.S.C. 154(b) by 453 days.

This patent is subject to a terminal disclaimer.

(21) Appl. No.: 13/120,858

(22) PCT Filed: Sep. 22, 2009

(86) PCT No.: PCT/US2009/057760
§ 371 (c)(1),
(2), (4) Date: May 3, 2011

(87) PCT Pub. No.: WO2010/047905
PCT Pub. Date: Apr. 29, 2010

(65) Prior Publication Data
US 2011/0212338 A1 Sep. 1, 2011

Related U.S. Application Data

(60) Provisional application No. 61/108,379, filed on Oct. 24, 2008.

(51) Int. Cl.
| | | |
|---|---|---|
| *B32B 27/08* | (2006.01) |
| *B32B 27/32* | (2006.01) |
| *B29C 47/06* | (2006.01) |
| *C08L 23/14* | (2006.01) |
| *C08L 23/06* | (2006.01) |
| *C08L 23/08* | (2006.01) |
| *C08L 23/10* | (2006.01) |
| *B32B 7/12* | (2006.01) |
| *B32B 27/16* | (2006.01) |
| *B32B 27/18* | (2006.01) |
| *B32B 27/20* | (2006.01) |
| *B32B 3/26* | (2006.01) |

(52) U.S. Cl.
CPC .............. *C08L 23/14* (2013.01); *B32B 3/266* (2013.01); *B32B 7/12* (2013.01); *B32B 27/08* (2013.01); *B32B 27/16* (2013.01); *B32B 27/18* (2013.01); *B32B 27/20* (2013.01); *B32B 27/32* (2013.01); *B32B 27/325* (2013.01); *B32B 27/327* (2013.01); *C08L 23/06* (2013.01); *C08L 23/0815* (2013.01); *C08L 23/10* (2013.01); *B32B 2270/00* (2013.01); *B32B 2307/30* (2013.01); *B32B 2307/412* (2013.01); *B32B 2307/50* (2013.01); *B32B 2307/516* (2013.01); *B32B 2307/518* (2013.01); *B32B 2307/54* (2013.01); *B32B 2307/72* (2013.01); *B32B 2307/736* (2013.01); *B32B 2439/00* (2013.01); *B32B 2519/00* (2013.01); *B32B 2553/00* (2013.01); *C08L 23/0823* (2013.01); *Y10T 428/31909* (2015.04); *Y10T 428/31913* (2015.04)

(58) Field of Classification Search
CPC ................ B32B 27/325; B32B 27/327; B32B 2307/516
See application file for complete search history.

(56) References Cited

U.S. PATENT DOCUMENTS

| | | | | |
|---|---|---|---|---|
| 5,532,030 A | * | 7/1996 | Hirose | .................... B32B 27/32 |
| | | | | 428/218 |
| 2002/0192412 A1 | * | 12/2002 | Satani et al. | ................... 428/35.7 |
| 2005/0142372 A1 | * | 6/2005 | Su et al. | ......................... 428/516 |
| 2005/0214557 A1 | | 9/2005 | Arthurs et al. | |
| 2006/0057410 A1 | * | 3/2006 | Saavedra et al. | ............. 428/515 |
| 2009/0220757 A1 | | 9/2009 | Patel et al. | |

FOREIGN PATENT DOCUMENTS

| | | |
|---|---|---|
| CA | 2 389 035 | 9/2001 |
| EP | 920989 A2 * | 6/1999 |
| EP | 1 632 343 | 3/2003 |
| EP | 1 300 238 | 4/2003 |
| JP | 2000-159946 | 6/2000 |
| JP | 2000-202951 | 7/2000 |
| JP | 2001215880 A * | 8/2001 |
| JP | 2005-047182 | 2/2005 |
| WO | WO 2004/018198 | 3/2004 |
| WO | WO 2005/097493 | 10/2005 |
| WO | WO 2006/071826 | 7/2006 |

OTHER PUBLICATIONS

Evolue, Mitsui Chemicals, printed from the internet Oct. 24, 2015.*
Mitsui Chemicals, EVOLUE product summary and SP0510 information, downloaded from the internet on Aug. 21, 2016.*

* cited by examiner

*Primary Examiner* — Monique Jackson
(74) *Attorney, Agent, or Firm* — Rao DeBoer Osterrieder, PLLC

(57) ABSTRACT

A multilayer heat shrink film including a core layer having an alpha-olefin polymer and at least one skin layer having a cyclic olefin copolymer (COC), process for its preparation and uses thereof.

19 Claims, No Drawings

MULTILAYER SHRINK FILMS, LABELS MADE THEREFROM AND USE THEREOF

CROSS-REFERENCE TO RELATED APPLICATIONS

The application claims priority from U.S. Provisional Application Ser. No. 61/108,379, filed Oct. 24, 2008, the contents of which are incorporated by reference in their entirety.

FIELD OF INVENTION

The present disclosure relates to multilayer shrink films comprising at least one core layer comprising an alpha-olefin polymer and at least one skin layer comprising a cyclic olefin polymer. More specifically this disclosure relates to labels made from these films, in particular roll-on-shrink-on labels, and to the use of such films and labels in packaging.

BACKGROUND OF THE INVENTION

Shrink labels represent a high proportion of labelling applications. High shrink labels are the fastest growing segment in the labelling business due to the trend toward using contoured containers and shrink sleeve labels with 360° graphics for high customer appeal.

Application of heat to a shrink label around a contour container causes the label to shrink preferentially in the direction extending circumferentially around the container and to conform to the outside container shape.

Shrink labels fall into two categories: roll-on-shrink-on (ROSO) labels and sleeve labels. ROSO labels are supplied from a reel, cut into sheets and applied around a container using hot melt to form a seam, with the machine direction (MD) of the film extending circumferentially around the container. ROSO films primarily shrink in the MD direction. ROSO labels generally employ biaxially oriented polypropylene (BOPP) films.

In contrast sleeve labels are supplied from a tube placed around a container, with the transverse direction (TD) of the film extending circumferentially around the container. Sleeve labels primarily shrink in the TD direction.

ROSO labels are preferred over sleeve labels since the sleeve labels are costly as they need to be seamed into a tube in an additional step whereas the ROSO labels are seamed around the container during the labelling step. Additionally application of a ROSO label around a container is a faster process than application of sleeve labels.

Current high shrink sleeve labels are sleeves made of a TD shrink film that is solvent seamed into a folded tube. These high shrink labels provide more than 60% shrinkage and are made of polyvinyl chloride (PVC), polyethylene terephthalate (PET), polyethylene terephthalate glycol (PETG) or oriented polystyrene (OPS). PVC and PET labels are not easily separated from PET bottle flakes using the flotation technique in the recycling process as the films have a density higher than 1 kg/dm$^3$. OPS film requires transportation and storage under controlled conditions due to high natural shrinkage. Natural shrinkage is a shrinkage phenomenon that occurs gradually at a storage temperature in a warehouse, and which causes deformation problems in a roll form.

While ROSO labels offer a cost advantage, the sleeve labels enjoy an advantage in the extent of shrink percentage that can be obtained. Sleeve labels typically shrink up to 60-70% around the circumference of a container whereas commercial ROSO films shrink only up to 20%.

In view of the cost advantage of the ROSO labels, it is desirable to identify a polyolefin based film suitable for ROSO labelling that can shrink around a container to a greater extent than the current BOPP ROSO labels, can shrink in a steam tunnel for high heat efficiency, and has a low natural shrinkage and can be easily separated from PET flakes for recycling. Clarity after shrinkage is another desirable property since the transparent label may be reversely printed to enable consumers to see the printing through the label.

WO2006/071826 discloses multilayer heat shrink film having a core layer comprising a blend of (i) at least one polyterpene and (ii) a syndiotactic polypropylene or a cyclic olefin copolymer (COC) and skin layers comprising one or more polyolefins having an ultimate shrinkage of at least 25% at 135° C. These films suffer from low stability and stiffness.

EP 1632343 discloses a multilayer heat shrinkable film composed of at least three layers comprising skin layers made of resin composition comprising 55 to 95% by mass of cyclic olefin based resin and from 45 to 5% by mass of a linear low-density polyethylene and an intermediate layer composed of a resin composition comprising 95 to 55% by mass of propylene-α-olefin random copolymer and from 5 to 45% by mass of the cyclic olefin based resin. The density and cost of such films are high.

It has now been discovered that by combining a polyolefin core layer with one or two skin layers composed of cyclic olefin copolymer (COC), the resulting film provides a high shrinkage ratio, good operability, optics and stiffness. It has also been discovered that coextruding COC skin layer(s) on a polyolefin core layer, and MD monoaxially orienting the composite film, results in a film easy to tear in TD, which is an advantage for cutting the labels. Finally the multilayer films according to this disclosure are particularly suitable to produce ROSO labels that are easily separated from the PET containers.

SUMMARY OF THE INVENTION

Accordingly, in some embodiments, the present disclosure relates to a multilayer heat shrink film comprising a core layer comprising one or more alpha-olefin polymer and at least one skin layer comprising one or more cyclic olefin polymer.

In other embodiments, this disclosure relates to a film comprising one core layer and two skin layers.

DETAILED DESCRIPTION

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

As used herein, "polymer" may be used to refer to homopolymers, copolymers, interpolymers, terpolymers, etc.

As used herein, the term "COC" means random copolymers of ethylene or propylene and cyclic olefin. Examples of cyclic olefins are norbornene and/or its derivatives, and/or tetracyclododecene and/or its derivatives.

Core Layer

As described above, the core layer comprises one or more alpha-olefin polymers. The alpha-olefins polymer used for the core layer preferably have melting points as determined by differential scanning calorimeter (DSC) in the range of from 60° C. to 125° C., more preferably from 60° C. to 100° C. The alpha-olefin polymers used for the core layer generally comprise propylene and ethylene homopolymers and copolymers and combination thereof. Core layers include propylene based elastomers, metallocene catalysed copolymer of propylene and ethylene, ethylene plastomers, metallocene catalysed linear low density polyethylene as defined hereafter and combination thereof.

Propylene-Based Elastomers

Propylene-based elastomers have a heat of fusion (Hf) less than or equal to 75 J/g and a triad tacticity of three propylene units, as measured by $^{13}$C NMR, of 75% or greater, or even 90% or greater. The lowered Hf may result from stereo- or regio errors and/or from the incorporation of one or more units derived from a comonomer of a $C_2$ or $C_4$-$C_{20}$ alpha-olefin and optionally diene-derived units. Such propylene-alpha-olefin elastomers can comprise between 6 to 25 wt. % alpha-olefin, more preferably more than 7 wt. % alpha-olefin. Polypropylene-based elastomers comprising from 8 to 12 wt. % ethylene are particularly suitable.

The peak melting points of the propylene-based elastomers as determined by DSC may be less than 105° C. or less than 130° C., for example when a small amount of a higher melting point fraction is present. Triad tacticity is determined according to the method as disclosed in US-A-20040236042. The propylene-alpha-olefin elastomers may have a Hf that is greater than or equal to 0.5 J/g and preferably less than or equal to about 50 J/g. The Hf is determined as in ASTM E-794-95 (version E-794-01). Preferred propylene-alpha olefin elastomers have a Mooney viscosity [ML (1+4) @ 125° C.], determined according to ASTM D1646, of less than 100, preferably less than 60 or less than 30. The molecular wt. distribution index (Mw/Mn)) of the propylene-alpha olefin elastomers may be from 1.8 to 3 as determined by Gel Permeation Chromatography (GPC). Propylene-based elastomers may be produced by different types of single site catalysts such as bridged metallocenes (see WO 1999/07788), pyridine amines (see WO03/040201) and unbridged metallocenes (see U.S. Pat. No. 5,969,070), preferably in a solution process. Propylene-based elastomers that may be useful in accordance with this disclosure are commercially available from ExxonMobil Chemical Company under the trade name of Vistamaxx™. Some of these materials are further commercially available from the Dow Chemical Company under the trade name Versify™.

Metallocene Catalysed Copolymers

Metallocene catalysed copolymers of propylene and ethylene are produced in solution, slurry or gas phase conditions using a single site metallocene catalyst activated by methods well known for such components, such as by aluminoxane or a non coordinating anion. The metallocene copolymers of propylene and ethylene are preferably copolymers of propylene and ethylene comprising from 2 to 6 wt. % ethylene. The peak melting point as determined by DSC is of between 110 and 135° C., preferably between 120 and 130° C. The Mw/Mn may be from 1 to 3 as determined by GPC.

Ethylene Based Plastomers

Ethylene based plastomers useful in this disclosure are very low density linear polyethylenes (VLDPE) having a density between 0.85 g/cm$^3$ to 0.91 g/cm$^3$ determined according to ASTM D1505. Ethylene-based plastomers contain a sufficient quantity of units derived from a $C_3$ to $C_{10}$ comonomer, preferably $C_4$ to $C_8$, alpha-olefins, among other things, to achieve the requisite density. Ethylene-based plastomers are preferably produced in solution or under high pressure conditions using single site catalysts such as bis-cyclopentadienyl or monocyclopentadienyl metallocenes.

Such plastomers may be commercially available from ExxonMobil Chemical Company under the trade name of Exact™, from Dow under the trade name of Affinity™, or from Mitsui under the trade name of Tafmer™.

Metallocene Linear Low Density Polyethylene

IN LLDPE, metallocene linear low density polyethylenes (LLDPE's) have a density of from 0.91 g/cm$^3$ to 0.94 g/cm$^3$ determined according to ASTM D1505. They may be produced in solution, slurry or gas phase conditions using a single site catalyst, such as a metallocene activated by methods well known for such components, such aluminoxane or a non-coordinating anion. Low melt index ratio linear polyethylene polymer is a linear polyethylene with a shear sensitivity expressed as melt index ratio $I_{21.6}/I_{2.16}$ ratio (MIR) of less than 30 as determined by ASTM-1238 (2.16 kg and 21.6 kg at 190° C.). The low MIR indicates no or a low level of long chain branches as well as a narrow molecular wt. distribution. High MIR linear polyethylenes include LLDPE's with an MIR of more than 30, which in combination with a relatively low Mw/Mn value is generally accepted to be indicative of the presence of long chain branching. These polymers may be referred to as "homogeneously branched linear polyethylenes". The branches are believed to be linear in structure and may be present at a level where no peaks can be specifically attributed to such long chain branches in the $^{13}$C NMR spectrum.

Metallocene LLDPE's may be commercially available from ExxonMobil Chemical Company under the trade name of Exceed™ and Enable™ or from Dow Chemical Company under the trade name of Elite™.

In an embodiment, core layers including propylene-based elastomers such as Vistamaxx™ and ethylene-based plastomers such as Exact™ provide improved shrink properties.

In an embodiment, the core layer comprises at least 80 wt. %, preferably at least 90 wt. %, more preferably at least 95 wt. %, and most preferably, at least 98 wt. % of alpha-olefin polymer(s) present in the core layer.

The core layer may contain less than 5 wt. % preferably less that 2 wt. % more preferably less that 0.5 wt. % of cyclic olefin copolymer (COC) as defined below based on the wt. of the polymers present in the core layer. Preferably the core layer is free from COC.

It is contemplated that the core layer may comprise other polymer(s) such as PETG, PET, polylactic acid (PLA), PVC, polystyrene (PS) or combination thereof. These polymers; however, are usually excluded form the core layer of the films according to this disclosure.

The core layer may contain other additives such as inorganic fillers, pigments, antioxidants, acid scavengers, ultraviolet absorbers, processing aids such as zinc stearate, extrusion aids, slip additives, permeability modifiers, antistatic additives, cavitating agents such as calcium carbonate and β-nucleating agents. These additives may be introduced into the core layer in the form of master batch in a polyolefin, typically in low density polyethylene (LDPE). LDPE may be used to improve melt strength of linear polymers and improve bubble stability when the film is produced on a blown line.

The core layer will preferably comprise from 20 to 90%, more preferably from 30 to 90 wt. % still more preferably from 50 to 85 wt. % and even more preferably from 50 to 70% wt. of the multilayer films of the present disclosure. For economical reasons the core layer usually comprises from 70 to 85 wt. % of the films of the present invention.

Skin Layer

The multilayer film of the present disclosure also comprises at least one skin layer comprising at least one cyclic olefin copolymer (COC). Preferably, the film comprises two skin layers, each comprising at least one COC.

The COC used in the present disclosure are random copolymers of ethylene or propylene and a cyclic olefin, such as, norbornene and/or its derivatives, and/or tetracyclododecene and/or its derivatives. The glass transition temperature of the COC is usually from 60 to 120° C., more preferably 70 to 80° C. The material's volume flow rate (MVR) measured at 260° C. under 2.16 kg according to ISO 113 is preferably between 1 and 60 ml/10 min preferably between 20 and 50 ml/10 min. The density of the COC according to ISO 1183 is typically between 1.00 to 1.06 g/dm$^3$. The number average molecular wt. measured by GPC is preferably from 1,000 to 1,000,000. COC useful according to the present disclosure may be commercially available from Ticona with a registered trade name of Topas® or from Zeon Chemicals with a registered trade name of Zeonor®.

In an embodiment, the skin layer comprises at least 55 wt. %, preferably at least 75 wt. % of polymers present in each skin layer, preferably at least 90 wt. % of COC based upon the wt. of all the polymer in the skin layer. In addition to the COC the skin layer(s) may also contain other film forming polymer resin(s) in a lesser amount, generally less than 45 wt. % of polymers present in each skin layer. Amounts less than 25%, preferably less than 10 wt. % based on the other polymer resin(s) are suitable. Such polymeric resin(s) include propylene and ethylene homopolymers and copolymers and any combination thereof.

The skin layer(s) may also advantageously contain other additives such as pigment, antioxidants, acid scavengers, ultraviolet absorbers, processing aids such as zinc stearate, extrusion aids, antiblock additives, slip additives or antistatic additives.

The skin layers may comprise from 10 to 80 wt. % preferably from 10 to 70 wt. % and more preferably from 15 to 50 wt. % and even more preferably from 30 to 50 wt. % of the multilayer films of the present disclosure. For economical reasons the skin layers usually comprises from 15 to 30 wt. % of the films of the present disclosure.

The skin layers may be made of different polymer(s) or of the same polymer(s) in different or in the same ratio. More preferably the films according to the present disclosure have two skin layers of the same polymer configurations and polymer composition ratios.

The multilayer film of this disclosure may optionally comprise one or more tie layers. Tie layers can be beneficial in helping to ensure good adhesion between the skin layers and the core layer. The tie layer, if present, will preferably comprise from 5 wt. % to 15 wt. % of the entire multilayer film.

In some embodiments, the multilayer films of this disclosure do not comprise tie layer.

The films according to this disclosure may be prepared by means known in the art. The films may be prepared by co-extrusion through a cast die or annular dies.

The film comprises two or more layers and has typically a thickness of from 5 to 300 μm, preferably from 10 to 150 μm. Films having a thickness of from 20 to 90 μm are particularly suitable according to the present disclosure.

As discussed above the films may be preferentially mono- or bi-axially oriented. In one embodiment, the films will be monoaxially oriented. Monoaxially oriented films are stretched in only one direction. The films according to this disclosure are preferably oriented monoaxially in the MD direction.

Without being bound by any theory, cast films that are monoaxially oriented in MD give optimal shrink properties while blown films can produce a film with good shrink properties. MD orientation of a blown film further improves shrink properties and decreases the temperature at which the film shrinks.

Machine direction (MD) orientation is accomplished by stretching the film as known in the art.

Films, according to this disclosure, may also be produced on a LISIM line as described in U.S. Pat. No. 6,908,687.

In a preferred embodiment, the extruded film is stretched in the machine direction only, in a single-stage process as described in WO 2006/071826. The multilayer films stretched in a single-stage stretching process typically have stretch ratio from about 2 to about 7, preferably from about 2 to about 3.

In another embodiment, the extruded sheet is monoaxially oriented using a two-stage stretching process wherein the extruded sheet is stretched twice in the machine direction as also described in WO 2006/71826. The draw ratio between the first draw rolls is usually about 1 to 5, and between the second draw rolls between 1 and 2.

In a preferred embodiment the multilayer film of the present disclosure is a three layer film monooriented in the machine direction having a core layer comprising at least 90 wt. % of one or more alpha-olefin polymer selected from propylene based elastomers, metallocene catalysed copolymer of propylene and ethylene, ethylene plastomers and metallocene catalysed linear low density polyethylene, and two skin layers comprising at least 90 wt. % of a COC having a glass transition temperature of from 70° C. to 80° C.

The films may be subjected to additional processes, such as, corona and/or plasma treatments, flame treatment, metallization through vacuum metallization, printable topcoat applied as needed to enhance the decorative nature of the label, lamination or protecting coating such as lacquers.

The multilayer heat shrink films of the present disclosure have a shrinkage typically of 20% or more, preferably 30% or more, more preferably 40% or more in the oriented direction when placed during 10 seconds in a water bath at temperature of from 60 to 100° C. or during 7 minutes in an oven at temperature of from 60 to 150° C. typically from 70 to 135° C. Shrinkage is determined by measuring the difference of sample length before and after the test (ASTM 1204). Preferably the multilayer heat shrink films of the present disclosure have a shrinkage under normal shrink label application temperature (for example from 60° C. to 150° C., typically from 70° C. to 135° C.) of less than 95%.

Clarity (especially contact clarity) and transparency are desirable in applications where a non-obscure view of the product around which the films label resides. High clarity and transparency are also desirable for "reverse" printing of labels where printing resides between the labels and the container and a consumer views the printing through the label.

Typically, films of the present disclosure have transparency values at a film thickness of 50 μm of 10 or more, preferably 15 or more, more preferably 20 or more. Transparency is determined according to ASTM method D-1746.

Haze values of the films according to this disclosure may range depending on the application. When the application requires high clarity and low haze, the haze value, determined according to ASTM method D-1003, at a film thickness of 50 μm is 20% or less, preferably less than 15%, more preferably 10% or less.

The stiffness of the multilayer films of the present disclosure is measured by using a Handle O Meter according to the ASTM D2923-70 and is provided in g/15 mm. The stiffness in the orientation direction according to this disclosure is of at least 25 g/15 mm, preferably at least 30 g/15 mm. Values of between 35 and 45 are easily obtained. Accordingly the oriented films according to this disclosure can be used in ROSO process at high line speeds.

Tensile modulus is measured according to ASTM D882 and is provided in $N/mm^2$.

The film density as determined according to ASTM D1505 are preferably lower than 0.96 $g/dm^3$. Values lower than 0.96 may be obtained according to the present disclosure. Such lower density films are useful for an easy separation of PET bottles flakes from the labels during the recycling process.

The films according to this disclosure are useful in many shrink film applications for packaging articles including without limitations, batteries, aluminium can containers, aerosol cans, plastic liquid beverage containers, glass containers and irregulate shaped containers.

The films of the present disclosure further have a particular utility as label such as sleeve-type labels, such as, ROSO labels. MD oriented films are more preferred for ROSO labels.

To convert films of the present disclosure into a ROSO label, the films are preferred be corona treated on one side of the film then printed on the corona treated side and cut to a desirable width preferably after printing. Printing can reside on the "reverse" side of the film to create a reverse printed label. In a ROSO label application, the reverse side of the film resides against the container and printing on the reverse side is viewed through the film when the film is around the container. These steps are typically done on a continuous web process by any method useful in the art.

Films and labels of the present disclosure can also advantageously possess perforations through the film or label. Perforations are most desirably located in the portion of a film proximate to the narrowest portion or portions of a container around which the film is applied in ROSO application. The perforations allow gas that would otherwise tend to become trapped between the label and container to escape, thereby allowing the label to more tightly conform to the container.

The benefits of the presence of COC in the skin layers arise from improving stiffness and shrink performance of the films with relatively thin layer of COC.

Finally, it was surprisingly discovered that a relatively thin COC layer not only greatly increased the shrink percentage at low shrinkage temperature, but also decreased natural shrinkage during roll storage, which would create film's deformation and difficulties on printing.

The following examples serve as an illustration of this disclosure, the measured features and the units for their expressions are explained hereafter.

EXAMPLES

Examples 1 to 3 According to this Disclosure, Produced on a Cast Line Equipped with an MD Orienter Multilayer cast films were prepared using multilayer cast film line. Each coextruded film had an A/B/A structure where the A layers were the skin layers comprising the COC and the B layer was the core layer.

The composition of the layers is as follows:

TABLE 1

|   | Example 1 | Example 2 | Example 3 |
|---|---|---|---|
| A | Topas ® 8007F-400 + 1000 ppm Tospearl ™ 145 | Topas ® 8007F-400 + 1000 ppm Tospearl ™ 145 | Topas ® 8007F-400 + 1000 ppm Tospearl ™ 145 |
| B | Total EOD01-05 | Exceed ™ 1018 | Vistamaxx ™ 3980 | wherein
Topas ® 8007F-400 COC commercially available from Topas ® having a glass transition temperature of 78° C.,
Total EOD01-05 Metallocene random copolymer of propylene commercially available from Total Petrochemicals containing 4 wt. % ethylene, having a peak melting point at 122° C. and a Melt Index according to ASTM D1238, 230° C., 2.16 kg of 8 g/10 min,
Exceed ™ 1018 Metallocene LLDPE comprising hexene commercially available from ExxonMobil Chemical Company having a Melt Index according to ASTM 1238 (2.16 kg 190° C.) of 1.0 g/10 min, a peak melting point at 119° C.,
Vistamaxx ™ 3980 Propylene based elastomer commercially available from ExxonMobil Chemical Company having a peak melting point at 77° C.,
Tospearl ™ 145 4.5 μm spherical crosslinked silicone antiblock manufactured by Toshiba Silicone Co., Ltd.

Each skin layer has a thickness after stretching of about 7.5 μm, the average total film thickness before the orientation step is about 125 μm.

The coextruded structures were cooled on a chilled roll and stretched 2.5 times using a MDO equipment composed of 4 preheat rolls, 2 draw rolls where the stretching takes place and 2 annealing rolls. The MDX stretching ratio (speed of the film at the exit of the MDO equipment divided by the speed of the film at the entrance of the MDO) was between 2.5 and 6. The thickness of the stretched film was 50 μm.

The following stretching conditions were used:

TABLE 2

|  | MDX | Preheat Temp. | Stretch Temp. | Annealing Temp. |
|---|---|---|---|---|
| Example 1 | 5.0 | 82° C. | 80° C. | 71° C. |
| Example 2 | 2.5 | 82° C. | 88° C. | 71° C. |
| Example 3 | 2.5 | 82° C. | 88° C. | 71° C. |

The films properties for these samples are presented in Table 3, while the shrink properties (MD shrink percentage versus temperature) are in Table 4.

TABLE 3

|  | Haze (%) | Haze after shrink at 120° C. | Modulus (N/mm$^2$) | | Stiffness (g/15 mm) | |
| --- | --- | --- | --- | --- | --- | --- |
|  |  |  | MD | TD | MD | TD |
| Example 1 | 5.3% | 9.7% | 1448 | 1125 | 39 | 25 |
| Example 2 | 3.7% | 13.8% | 833 | 737 |  |  |
| Example 3 | 2.4% | 19.2% | 975 | 815 | 38 | 29 |

TABLE 4

|  | Temperature (° C.) | | | | | |
| --- | --- | --- | --- | --- | --- | --- |
|  | 70 | 80 | 90 | 100 | 110 | 120 |
| Example 1 | −5% | −18% | −32% | −40% | −53% | −64% |
| Example 2 | −7% | −26% | −34% | −40% | −48% | −63% |
| Example 3 | −2% | −27% | −56% | −55% | −58% | −63% |

Example 4

A Multilayer film was obtained as in examples 1 to 3 except for the composition of the films and the stretching conditions.

The composition A/B/A of the coextruded film is 7.5 μm Topas® 8007F-400+1000 ppm Tospearl™ 145/Equistar M6030/7.5 μm Topas® 8007F400+1000 ppm Tospearl™ 145 wherein Equistar™ M6030 is a high density polyethylene (HDPE) (Density 0.960 g/cm$^3$) having a Melt Index according to ASTM 1238 (2.16 kg, 190° C.) of 3.

The coextruded structure was cooled on a chilled roll and stretched under the following stretching conditions: MDX: 2.5, preheat temperature: 82° C., stretching temperature: 88° C., and annealing temperature: 71° C.

The film has a haze before shrink of 3.8%, a Haze after shrink at 120° C. of 19.1%, a modulus in MD of 1506 and in TD of 1518 N/mm$^2$ and a stiffness in MD of 37 g/15 mm. and in TD of 27 g/15 mm.

Examples 5 to 7 According to this Disclosure, Produced on a Blown Line with an MDO 125 μm films were produced on a Windmöller and Hölscher blown line using a 250 mm diameter die, 1.4 mm die gap opening and a blow up ratio of 2.5.

TABLE 5

|  | Example 5 | Example 6 | Example 7 |
| --- | --- | --- | --- |
| Layer thickness distribution | 1/4/1 | 1/6/1 | 1/6/1 |

TABLE 5-continued

|  | Example 5 | Example 6 | Example 7 |
| --- | --- | --- | --- |
| Layers A | Topas ® 8007F-400 + 3% Schulman AMF702 | | |
| Layer B | Vistamaxx ™ 3980 + 20% LD150 | Vistamaxx ™ 3020 + 40% LD166BA | Exceed ™ 1018CA + 20% LD150BW | wherein
Exceed ™ 1018CA Metallocene LLDPE comprising hexene, having a MI of 1.0, a density of 0.912 g/dm$^3$ and a peak melting point at 116° C.,
LD150BW Low Density Polyethylene, commercialized by ExxonMobil Chemical Company, (LDPE), having a MI of 0.75, a density of 0.923 g/dm$^3$ and a peak melting point at 109° C.,
LD166BA LDPE, commercialized by ExxonMobil Chemical Company, having a MI of 0.20, a density of 0.923 g/dm$^3$ and a peak melting point of 110° C.,
Vistamaxx ™ 3020 Propylene based elastomer with 11 wt. % ethylene, a peak melting point of 72° C.,
Schulman AMF702 fluoropolymer masterbatch from Schulman.

The film was then stretched off-line on an Alpine MDO equipment, with a stretching ratio (MDX) of 2.5.

The MDO equipment was composed of preheat rolls (4), draw rolls (2) where the stretching takes place, annealing rolls (3) and cooling rolls (2). The stretching ratio was 2.5. The thickness of the stretched film was 50 μm.

The stretching conditions are given in Table 6.

TABLE 6

|  | Example 5 | Example 6 | Example 7 |
| --- | --- | --- | --- |
| Preheat T | 80° C. | 90° C. | 90° C. |
| Stretch T | 80° C. | 95° C. | 95° C. |
| Annealing T | 75° C. | 75° C. | 75° C. |
| Cooling T | 40° C./20° C. | 40° C./20° C. | 40° C./20° C. |

The shrink properties (MD shrink percentage versus temperature) are in Table 7.

TABLE 7

|  | Temperature (° C.) | | | | | | |
| --- | --- | --- | --- | --- | --- | --- | --- |
|  | 70 | 80 | 90 | 100 | 110 | 120 | 135 |
| Example 5 | −4% | −20% | −57% | −60% | −62% | −66% | −75% |
| Example 6 | −2% | −33% | −56% | −58% | −63% | −70% | −71% |
| Example 7 | −8% | −23% | −32% | −58% | −63% | −70% | −71% |

Examples 8 to 9 According to this Disclosure, Produced on a Blown Line without an MDO 50 μm films were produced on a Windmöller and Hölscher blown line using a 250 mm diameter die, 1.4 mm die gap opening and a blow up ratio of 2.0.

TABLE 8

|  | Example 8 | Example 9 |
| --- | --- | --- |
| Layer thickness distribution | 1/6/1 | 1/6/1 |
| Layers A | Topas ® 8007F-400 + 3% Schulman AMF702 | |
| Layer B | Exceed ™ 1018CA + 40% LD166BA | Vistamaxx ™ 3020 + 40% LD166BA |

The film was not stretched off-line on MDO equipment.

The shrink properties (MD shrink percentage versus temperature) are in Table 9.

TABLE 9

| | Temperature (° C.) | | | | | | |
|---|---|---|---|---|---|---|---|
| | 70 | 80 | 90 | 100 | 110 | 120 | 135 |
| Example 8 | 0% | −1% | −2% | −4% | −10% | −47% | −73% |
| Example 9 | −0% | −10% | −10% | −15% | −29% | −62% | −73% |

The films as described in the illustrative examples have been tested on a Krones Reel Fed labeling machines, using UV hot melt to form a seam as described in U.S. Pat. No. 6,808,822, column 13, lines 15 to 28 or using a laser or solvent to weld the seam.

The labels were shrunk in a steam or hot air tunnel and conform well around the container contours. The results are as follows:

| | Tested | |
|---|---|---|
| | Hot Air | Steam |
| Example 1 | Good | Bad |
| Example 2 | Good | Good |
| Example 3 | Good | Good |
| Example 4 | Bad | Bad |
| Example 5 | Good | Good |
| Example 6 | Good | Good |
| Example 7 | Good | Good |
| Example 8 | Good | Bad |
| Example 9 | Good | Bad |

Films of examples 1-3 and 5-8 provide excellent labels and show good appearance after shrinkage, films of example 4 shrink properly but exhibit wrinkles or blisters after shrinkage.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

What is claimed is:

1. A multilayer heat shrink film comprising:
   a core layer comprising at least 80 wt. % of one or more alpha-olefin polymers and a first cyclic olefin copolymer (COC), wherein the first COC is less than 5 wt. % of the core layer, and wherein the alpha-olefin polymer of the core layer is selected from a group consisting of propylene-based elastomers having ethylene comprising from 8 to 12 wt. % ethylene, ethylene-based plastomers having a density from 0.85 g/cm$^3$ to 0.91 g/cm$^3$, metallocene-catalyzed copolymers of propylene and ethylene comprising from 2 to 6 wt. % ethylene, and combinations thereof;
   two skin layers comprising at least 50 wt. % of a second cyclic olefin copolymer (COC) having a glass transition temperature of from 60 to 120° C.;
   flame, corona and/or plasma treatment of at least one of the two skin layers, and
   monoaxial orientation in a machine direction of the multilayer heat shrink film to render the multilayer heat shrink film tearable in a transverse direction.

2. The multilayer heat shrink film of claim 1, wherein the second COC is selected from random copolymers of ethylene or propylene with a cyclic olefin selected from norbornene, norbornene derivative, tetracyclododecene, and/or a derivative of tetracyclododecene.

3. The multilayer heat shrink film of claim 2, wherein the second COC has a glass transition temperature of from 70 to 80° C.

4. The multilayer heat shrink film of claim 1, wherein each skin layer comprises at least 90 wt. % of the second COC.

5. The multilayer heat shrink film of claim 1, wherein the composition of the first and second COC are identical.

6. The multilayer heat shrink film of claim 1, wherein one or both of the two skin layers comprise printable skin layers.

7. The multilayer heat shrink film of claim 1, wherein the film comprises perforations.

8. The multilayer heat shrink film of claim 1 comprising a haze value of 20% or less.

9. The multilayer heat shrink film of claim 1 comprising shrinkage 20% or more in an oriented direction.

10. The multilayer heat shrink film of claim 1 comprising clarity and transparency sufficient for viewing reverse printing of labels.

11. The multilayer heat shrink film of claim 1, further comprising at least one metallization layer deposited on at least one of the two skin layers post-treatment.

12. An article comprising flexible packaging comprising the multilayer heat shrink film of claim 1.

13. A label comprising the multilayer heat shrink film according to claim 1.

14. A method comprising: receiving at least one roll of the multilayer heat shrink film of claim 1; and converting the at least one roll into one or more labels.

15. A method of making a film comprising:
   co-extruding at least 80 wt. % of one or more alpha-olefin polymers and a first cyclic olefin copolymer (COC), wherein the first COC is less than 5 wt. % of the core layer, and wherein the alpha-olefin polymer of the core layer is selected from a group consisting of propylene-based elastomers having ethylene comprising from 8 to 12 wt. % ethylene, ethylene-based plastomers having a density from 0.85 g/cm$^3$ to 0.91 g/cm$^3$, metallocene-catalyzed copolymers of propylene and ethylene comprising from 2 to 6 wt. % ethylene, and combinations thereof; and two skin layers comprising at least 50 wt. % of a second cyclic olefin copolymer (COC) having a glass transition temperature of from 60 to 120° C. to form a co-extrudate; and
   monoaxially orienting the film in a machine direction to render the film tearable in a transverse direction, and flame, corona and/or plasma treating at least one of the two skin layers.

16. The method of claim 15, wherein the co-extruding is through a cast die or annular dies.

17. The method of claim 15, further comprising blowing or casting the co-extrudate to form the film.

18. The method of claim 15, further comprising metallizing, subsequent to the treating, at least one of the two skin layers.

19. The method of claim 15, further comprising perforating the film.

* * * * *